(12) United States Patent
Mueller (10) Patent No.: US 7,489,627 B2
(45) Date of Patent: Feb. 10, 2009

(54) TELECOMMUNICATION NETWORK AND UPGRADING METHOD THEREFORE

(75) Inventor: Goetz Mueller, Weissach i. T. (DE)

(73) Assignee: Ericsson AB, Stockholm (SE)

( * ) Notice: Subject to any disclaimer, the term of this patent is extended or adjusted under 35 U.S.C. 154(b) by 427 days.

(21) Appl. No.: 10/523,614

(22) PCT Filed: Aug. 4, 2003

(86) PCT No.: PCT/IB03/03776

§ 371 (c)(1),
(2), (4) Date: Dec. 30, 2005

(87) PCT Pub. No.: WO2004/016005

PCT Pub. Date: Feb. 19, 2004

(65) Prior Publication Data

US 2006/0129706 A1      Jun. 15, 2006

(30) Foreign Application Priority Data

Aug. 2, 2002    (DE)   ............................ 102 35 646

(51) Int. Cl.
*H04J 1/16*    (2006.01)
*H04J 3/14*    (2006.01)

(52) U.S. Cl. ...................................... 370/227; 370/228
(58) Field of Classification Search .................. None
See application file for complete search history.

(56) References Cited

U.S. PATENT DOCUMENTS

| | | | | |
|---|---|---|---|---|
| 5,313,456 | A * | 5/1994 | Sugawara | 370/228 |
| 6,125,111 | A | 9/2000 | Snow et al. | |
| 6,278,688 | B1 * | 8/2001 | Suutari et al. | 370/217 |
| 6,327,244 | B1 * | 12/2001 | Sakamoto et al. | 370/218 |
| 7,319,662 | B2 * | 1/2008 | Chi et al. | 370/216 |
| 2003/0152114 | A1 * | 8/2003 | Sandstrom | 370/537 |
| 2003/0179707 | A1 * | 9/2003 | Bare | 370/235 |
| 2006/0203719 | A1 * | 9/2006 | Kim et al. | 370/227 |

FOREIGN PATENT DOCUMENTS

| | | |
|---|---|---|
| DE | 39 06 545 A1 | 9/1990 |
| DE | 196 33 744 A1 | 2/1998 |
| EP | 1 133 197 A1 | 9/2001 |
| WO | WO 99/11031 | 3/1999 |

* cited by examiner

*Primary Examiner*—Ajit Patel
(74) *Attorney, Agent, or Firm*—Kirschstein, et al.

(57) ABSTRACT

For upgrading a section of a telecommunication network comprising two nodes, one of the data lines interconnecting the nodes is selected to be a carrier of redundant specimens of information units to be transmitted. An external condition is fulfilled, which is detected by a control unit of the node and causes the control unit to block changes to connections going via the line. In this state, the interface circuits of nodes connected to the selected line are replaced by more powerful ones, and the condition is unfulfilled again. The method is repeated for the other data line.

18 Claims, 5 Drawing Sheets

TELECOMMUNICATION NETWORK AND UPGRADING METHOD THEREFORE

The present invention relates to a telecommunication network comprising a plurality of nodes and bi-directional data lines extending between two nodes in the form of groups of at least two lines, and a method for upgrading such a network.

Network structures of this type, in which said groups, as a rule, are formed of precisely two bi-directional lines, are used for fail-safe data communication, wherein two specimens, referred to in the following as working specimen and redundant specimen, respectively, of an information unit inserted into the network at a given starting node are transmitted to a target node via different lines. Under undisturbed operation of the network, the target node receives both the working specimen and the redundant specimen, but takes account of the working specimen only for forwarding to a terminal connected to it; the redundant specimen is discarded. Only if in case of a failure the target node does not receive the working specimen, it will forward the redundant specimen to the receiver terminal. In this way, a practically interruption-free transmission operation is guaranteed even in the case of failures of individual data lines.

Generally, nodes of such a telecommunication network comprise a plurality of interface circuits installed on a plurality of circuit boards, a switching matrix and a control unit. A function of the interface circuits is to receive a data stream from an associated bi-directional data line and to decompose it into a plurality of channels, which, under the control of the control unit, are forwarded to different interface circuits by the switching matrix, wherein these latter interface circuits combine a plurality of channels supplied from the switching matrix to a data stream to be output on an associated bi-directional data line. Interface circuits and switching matrices are available with various capacities, i.e. with various numbers of channels that can be processed simultaneously. In a telecommunication network according to the SDH standard, there are interface circuits for 4, 16, and in the future also 64 channels, referred to as containers in the SDH-system, and corresponding switching matrices.

The ever-increasing demand for transmission capacity in the telecommunication networks requires a continuous upgrade of these networks. Such an upgrade must not lead to an interruption of the data traffic, and also the redundancy of the data traffic should be maintained as far as possible during an upgrade operation.

The object of the present invention is to provide a telecommunication network, components for a telecommunication network and a method for upgrading a telecommunication network that allow an easy and fail-safe upgrading procedure.

The object is achieved on the one hand by a section of a telecommunication network comprising two nodes and a group of at least two bi-directional data lines extending between the two nodes, wherein at least one of the data lines is redundant,
each node comprises a control unit, at least one switching matrix and a plurality of interface circuits,
each data line is connected to an interface circuit of each of the two nodes,
each interface circuit is adapted to transmit a determined number of channels between the data line and the switching matrix,
the control unit of a node has access to a configuration record which at any time indicates existing connections between channels of the interface circuits via the switching matrix, and
the control unit is adapted to monitor whether an external condition holds or not, and, if the condition does not hold, to allow changes to connections specified in the configuration record and, if the condition holds, to block changes to the connections specified in the configuration record, but to allow further transmission of information via the switching units of the node.

It must be understood that redundancy does not mean here that at any time there must be a line on which no working data are transmitted. It is sufficient if at any time the possibility exists of distributing the existing working data traffic among the lines so that one line becomes free of working data traffic.

By voluntarily fulfilling the external condition, it is possible to induce the control unit to freeze the connections specified in the configuration record. In this "frozen" state it is possible to remove an interface circuit, via which the frozen connections go, to insert a new, more powerful circuit in its place, while the connections specified in the configuration record for this interface circuit remain valid, and afterwards, by unfulfilling the external condition, to allow the specified connections to be updated according to demand.

The data lines between the two nodes may have 1+1 protection or 1:N protection. In the first case, a first one of the two nodes transmits a working specimen and a redundant specimen of each information unit to be transmitted to the second node on different lines of the group, so that as a rule the second node will only take account of one of the two received specimens. In case of a failure of reception of the working specimen, it is thus possible to recur immediately and without interruption to the redundant specimen. In the latter case, one of N+1 lines (N=1, 2, 3, . . . ) is a backup line which, in case of failure of one of the N lines transmitting working data, is available as a replacement for this line. In this embodiment, the transition to the backup line may be slightly slower than with 1+1 protection, since in case of a failure, the receiver must first request the sending node to switch over to the backup line; an advantage, however, is the more efficient use of the lines when compared to 1+1 protection, on the one hand due to the possibility of making safe a large number N of lines by one backup line, on the other hand because under undisturbed operation the backup line is available for transmitting data traffic of low priority.

Preferably, the external condition is selected such that it can be fulfilled or not fulfilled for each individual interface circuit of a node independently from its other interface circuits, and the control unit is adapted to freeze, in case that the condition is fulfilled for one of the interface circuits, only those connections in the configuration record which go via the interface circuit for which the condition is fulfilled. This is particularly useful in a node having a plurality of interface circuits each connected to a different other node, because thus the freezing only affects connections of an interface circuit which is actually to be exchanged, while the operation of the remaining interface circuits remains unchanged. The impediment associated with the freezing is thus restricted to an individual data line between two nodes; the data communication of these two nodes with third nodes remains unimpaired.

Preferably, the configuration record further specifies for each interface circuit of the node the number of channels supported by it.

Preferably, the external condition is a discrepancy between the number of channels an interface circuit is able to process indicated in the configuration record and the actual number of these channels. It thus becomes possible to fulfil the external condition for freezing the connections simply by entering the channel number of a new interface circuit into the configuration record before an old interface circuit is physically replaced by this new one. Then, as soon as the new interface circuit is inserted, the external condition is automatically no longer fulfilled, and a specific step for unfulfilling the condition becomes unnecessary.

Preferably, the node is adapted, after detecting fulfillment of the condition, i.e. specifically after changing the channel number recorded in the configuration record, to verify only after receipt of an external command whether the condition is still fulfilled, and to remove the blocking in case of the condition not being fulfilled. In such an embodiment, the frozen connections will not automatically be "thawed" after exchange of the interface circuit, but a corresponding command from the user is waited for, so that before normal operation is resumed, the user has time available for, eventually, carrying out further measures or checks. Since not simply a command for "re-thawing" the connections is given but a command to check the condition, eventual errors are recognized that may have occurred during exchange of the interface circuit, and in case of such an error, the connections remain frozen.

A method for upgrading the telecommunication network section mentioned above preferably comprises the following steps:
a) determining a data line of the group to be the line not used for working data transmission, be it as a carrier of redundant specimens of information units to be transmitted in case of 1+1 protection or as a backup line in case of 1:N protection (N=1, 2, 3, . . . );
b) fulfilling the external condition;
c) replacing the interface circuits connected to the selected line.

These steps are repeated until all interface circuits connected to data lines of the group are exchanged. Then the external condition is unfulfilled, wherein this unfulfillment, as mentioned above already, may be an automatic consequence of the exchange in that a discrepancy which was voluntarily created before between a channel number of the interface circuit to be exchanged specified in the configuration record and its actual channel number is removed by exchanging this circuit.

By first determining a data line of the group as a carrier of redundant specimens and subsequently carrying out the exchange of interface circuits at this data line, it is ascertained that the interruption of data traffic which is unavoidable in such an exchange does not concern working data but only redundant data which, under normal operation of the telecommunication network, would not have been taken account of at their target node anyway.

I.e. during the exchange of an interface circuit there is no interruption of the data traffic but merely a temporarily disruption of its redundancy.

Before exchanging an interface circuit it may be necessary to replace the switching matrix of the concerned node by a more powerful one. In a node with at least two switching matrices, an interruption of the data traffic is avoided in this case by determining the switching matrix to be exchanged as the switching matrix for the redundant specimens of the information units to be transmitted before exchanging it.

The method described above is straightforwardly applicable in a telecommunication network in which in the group of bi-directional data lines connecting two nodes with each other, both the working specimens and the redundant specimens of information units to be transmitted between these nodes are transferred. Incidentally, a network structure which is preferred over networks of this type is one in which a plurality of nodes are connected into a ring by groups of bi-directional data lines, since these allow to transmit working specimen and redundant specimen of an information unit to be transmitted from the starting node to the target node on the ring in different circulation directions, so that the interruption of an entire group of data lines between two nodes or a failure of a node between start and target nodes does not prevent the information unit from reaching the target node— as the working specimen or the redundant specimen. In order to make the upgrading procedure of the invention applicable in these latter network structures, too, it is preferred to switch over, before carrying out the above steps a) to c), from the operating node in which working specimens and redundant specimens of the information to be transmitted are transferred in different directions on the ring into a mode in which the working specimens and redundant specimens circulate in the same direction, then to carry out steps a) to c) and, after having exchanged the interface modules, to revert to the initial mode with opposite circulation directions.

Further features and embodiments of the invention become apparent from the subsequent description of embodiments relating to the appended Figures.

Figures 1, 2:
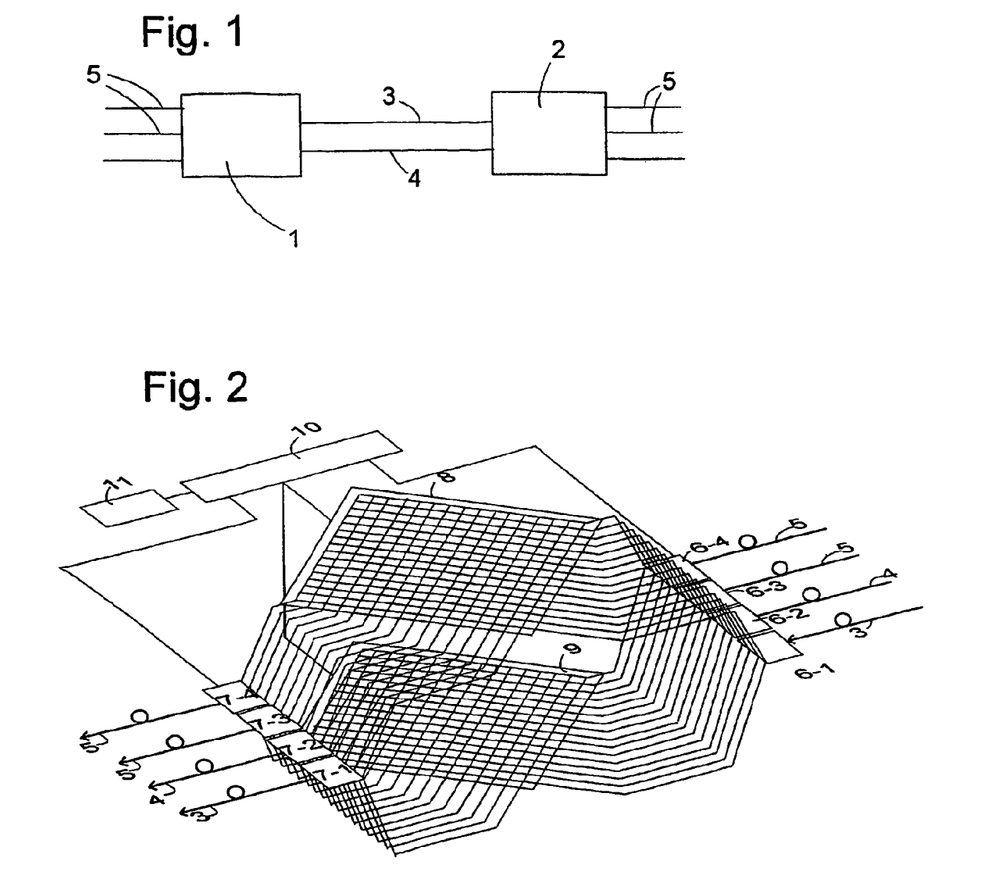
FIG. 1 is a schematic diagram of a section of a telecommunication network in which the invention is applicable.
FIG. 2 is a detailed block diagram of a node of the network section of FIG. 1 in an initial stage of the upgrading procedure.

FIG. 1 is a highly schematic representation of a part of a telecommunication network having two nodes 1, 2, which are connected directly, i.e. without further intermediate nodes, by a group of two bi-directional data lines 3, 4. Further ports 5 connect the nodes 1, 2 with other nodes or telecommunication terminals, not shown.

From each information unit that is fed to node 1 by a transmitter terminal connected to it and which is intended for a receiver terminal connected to node 2, node 1 generates two specimens, referred to as working specimen and redundant specimen, respectively, which are transferred to node 2 by the different data lines 3,4. While the network operates without failure, node 2 ignores the redundant specimen and only forwards the working specimen to the receiver terminal; if due to a failure, e.g. an interruption of line 3, the working specimen does not arrive, node 2 switches over internally and forwards the redundant specimen to the receiver terminal. In spite of the failure, the receiver terminal thus receives a complete data stream.

FIG. 2 shows schematically the internal design of node 1. Node 2 has the same design. Node 1 comprises two identical switching matrices 8, 9, each of which, in the example shown here, has 16 input and output ports. Under the control of a control unit 10, connections between arbitrary ones of the input and output ports may be formed. The input and output ports of the matrices 8, 9 are connected pairwise to an input interface circuit 6-1, 6-2, . . . , 6-4 and to an output interface circuit 7-1, 7-2, . . . , 7-4, respectively. The input interface circuits 6-1, 6-2 receive data from the other node 2 via the data lines 3, 4; the output interface circuits 7-1, 7-2 transmit data to the node 2 via the lines 3, 4. Other input and output interface circuits 6-3, 6-4 and 7-3, 7-4, respectively, are connected to other nodes of the network via the lines 5 or to data sources and sinks, respectively, that are locally attached to node 1.

Under normal operating conditions, node 1 receives a working specimen and a redundant specimen of each information unit sent to it by node 2 via the input interface circuits 6-1, 6-2. Both reach an input port of switching matrix 8 and switching matrix 9, respectively.

A control unit 10 controls the two matrices 8, 9 such that only for the working specimen a connection to two output ports of the matrices 8 and 9 is switched; the redundant specimen remains unconnected. Only in case of non-reception of the working specimen the control unit changes the connections in the matrices 8, 9 such that the redundant specimen is connected to the same output ports as was the working specimen. To the two output ports, output interface circuits are attached, whose lines 5 lead to a same further node of the network or to a same data sink.

Mutually corresponding output ports of the two matrices 8, 9 are connected to a same output interface circuit 7-1, ..., 7-4. When both matrices 8, 9 operate correctly, identical information units from both matrices arrive at the output interface circuits 7-1, 7-2. These have a selecting switch which admits information units from only one of the two matrices 8, 9 to line 3 and 4, respectively, and which, in case of a failure of this matrix, switches over to the other matrix 9 or 8, respectively.

Each interface circuit 6-1, ..., 7-4 processes a pre-determined number of channels. In the representation of FIG. 2, there are four channels, symbolized by four lines attaching each of the interface circuits to the matrix 8 and to the matrix 9. It is obvious, however, that any other (even) number of channels would be possible.

The number of input and output ports of the switching matrices 8, 9 corresponds here to the total number of channels of the interface circuits 6-1 to 7-4. If an interface circuit was replaced by a more powerful one, it would not straightforwardly be possible to use it, since there are no free input/output ports of the switching matrices 8, 9 available that might correspond to the increased number of channels which the interface circuit is able to process.

A first step of a method for increasing the capacity of the node 1 without interrupting its operation therefore consists of exchanging the switching matrices 8, 9. To this end, at first a central unit (not represented) which may be located outside of node 1 sends an instruction to the control unit 10 to connect the selecting switches of all output interface circuits 7-1, ..., 7-4 to matrix 9.

When this switchover is carried out, by a subsequent removal of matrix 8 only the redundancy inside the node is lost, but there is no interruption of the working data traffic.

After replacing the switching matrix 8 by a new matrix 8' having a larger number of input/output ports, by a new instruction to the control unit 10 the selecting switches of all output interface circuits 7-1, ..., 7-4 are set to matrix 8', and matrix 9 may be replaced in the same way.

Figure 3:
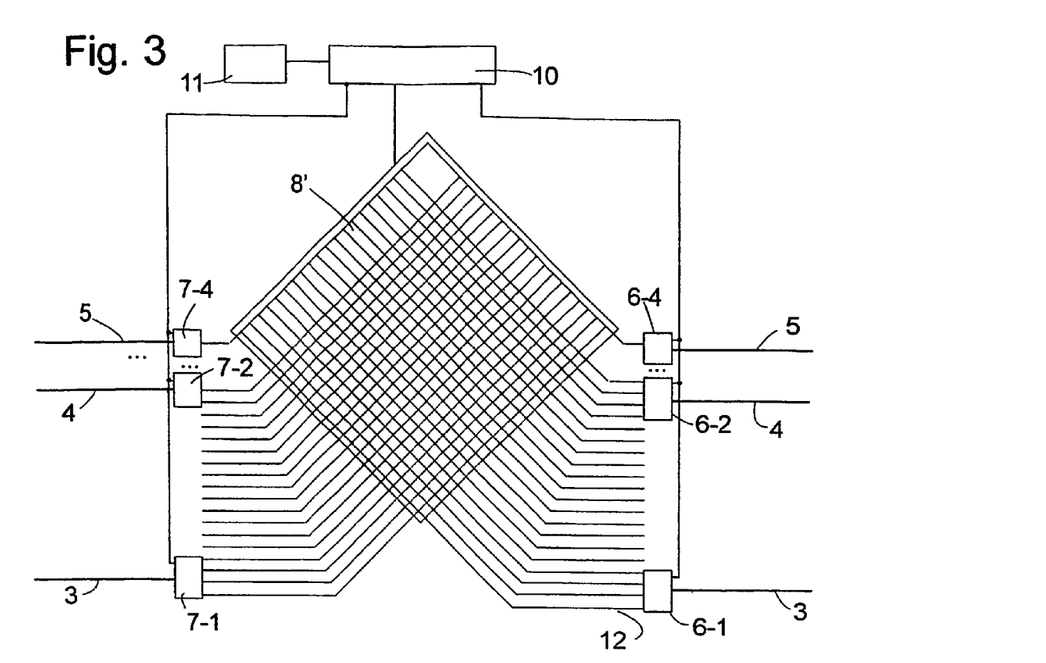
FIG. 3 is the node of FIG. 1 after upgrading the switching matrix.

FIG. 3 represents the resulting state of node 1, wherein for the sake of clarity the matrix replacing matrix 9 is not shown. The matrix 8' here has 64 input/output ports, only a quarter of which is used by the interface circuits 6-1, ..., 7-4.

The control unit 10 is associated with a configuration register 11 that contains various information about the structure of the node 1 and a continuously updated directory of the connections established in the switching matrices. The configuration record 11 helps the control unit 10, among others, to recognize operation failures or erroneously set operating parameters of node 1. The operating parameters recorded in node 1 comprise, among others, the number of channels which each interface circuit 6-1, ..., 7-4 is able to process. This number of channels may be set by an instruction sent from outside to the control unit 10; however, the control unit 10 is also capable of reading the number of channels which an interface circuit is able to process from this interface circuit or of measuring it. If the control unit 10 detects a discrepancy between a channel number recorded in the configuration record 11 and an actual channel number of an interface circuit such as circuit 6-1, it reacts, on the one hand by generating an error message, and on the other, by "freezing" the concerned connections, i.e. by blocking all modifications to connections established in the switching matrix 8' that go via the concerned interface circuit 6-1.

The straightforward purpose of this measure is to prevent new connections from being generated via an interface circuit, which might be wrongly configured and may therefore not be capable of correctly processing the data to be transmitted by this connection. Connections existing before recognition of the error remain in existence, because, if these work correctly, it is not desirable to interrupt them, and if they do not work correctly, letting them subsist will at least not cause a decrease of transmission quality.

Figure 4:
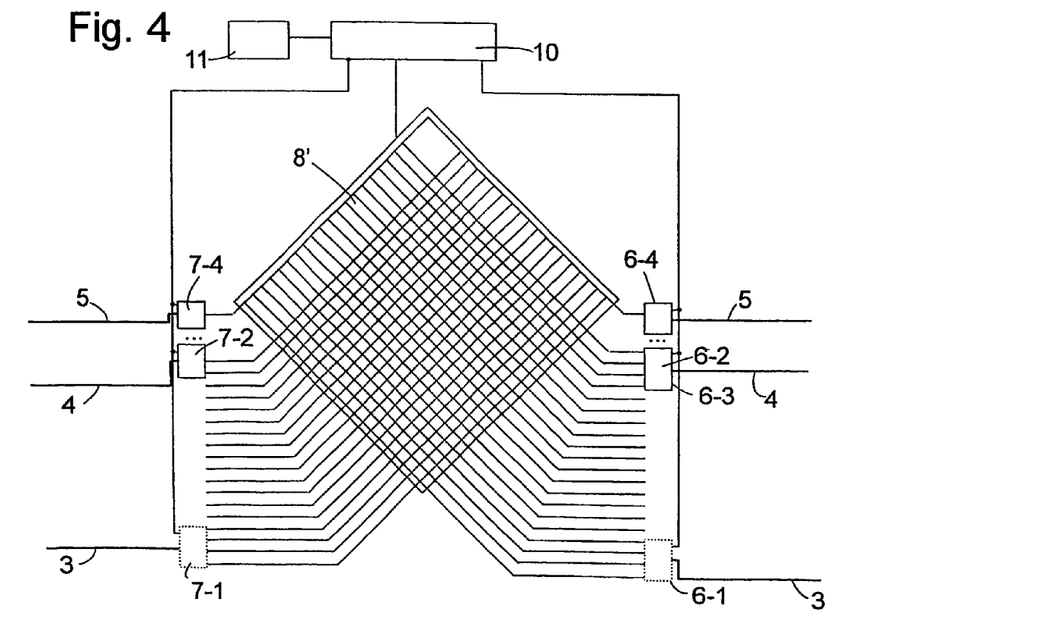
FIG. 4 is the node of FIG. 3 after removing an interface circuit.

This mode of operation of the control unit 10 and the interface circuits 6-1, ..., 7-4 is made use of according to the invention for upgrading the interface circuits, by sending, for a pair of interface circuits to be exchanged, here the circuits 6-1, 7-1 connected to line 3, after switching over all working data traffic between the concerned node 1 and the node 2 connected to it via lines 3, 4, to the interface circuits 6-2, 7-2 connected to line 4, an instruction to control unit 10 to replace the maximum channel number of circuits 6-1, 7-1 recorded in configuration record 11 by that of circuits 6-1', 7-1' which are to be installed in place of circuits 6-1, 7-1. The control unit 10 recognizes the discrepancy between the value entered in record 11 and the actual capacity of circuits 6-1, 7-1, generates an error message and freezes existing connections going via line 3. The circuits 6-1, 7-1 may now be removed, as represented in FIG. 4 by a dashed outline, without this causing a deletion of the connections going via circuits 6-1, 7-1, as would usually be the case if an interface circuit is removed or fails.

Figure 5:
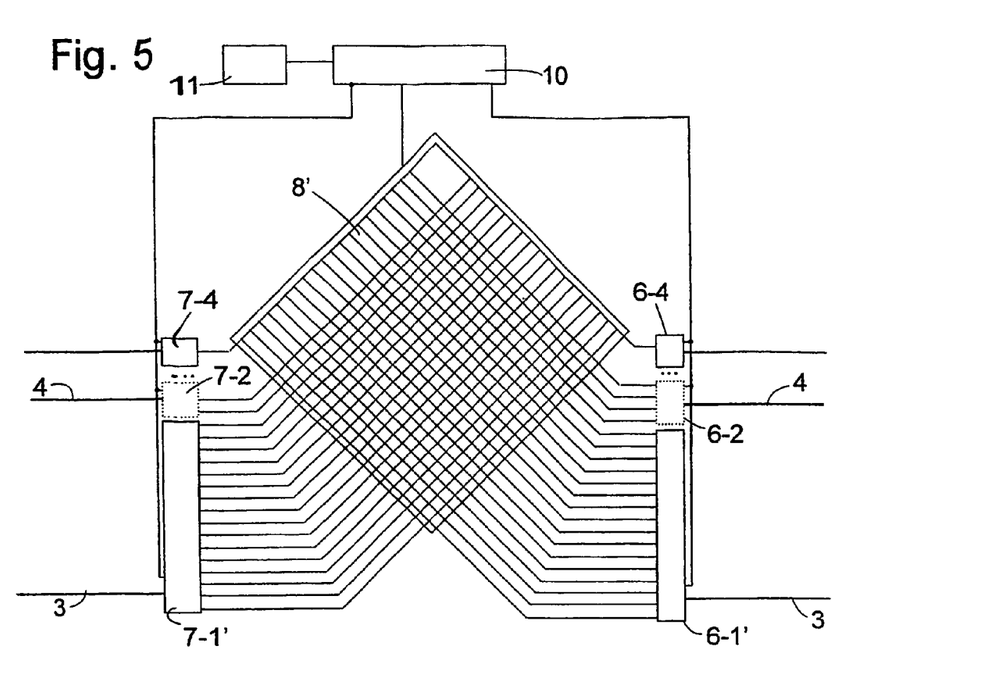
FIG. 5 is the node after replacing the removed interface circuit by a more powerful circuit.

The removed circuits 6-1, 7-1 are replaced by circuits 6-1', 7-1' having a higher, in FIG. 5 fourfold, capacity. For these circuits 6-1', 7-1', the number of processable channels recorded in configuration record 11 agrees with the real situation, so that the condition, which had caused the connections to be frozen, no longer holds.

If the control unit 10 automatically and regularly compares the recorded and the actual channel number, the non-fulfillment of the condition automatically causes the unit 10 to allow connections in which the interface circuits 6-1', 7-1' are involved to be changed again. But it may also be provided that the control unit carries out such a comparison only upon reception of a corresponding instruction. In this case, the instant when the node resumes normal operation after an upgrade is under control of a user, who has such an instruction sent by a central control unit located outside the node.

When the interface circuits 6-1, 7-1 connected to line 3 have been exchanged, in the next step the working data traffic is shifted from input interface circuit 6-2 to circuit 6-1' and from output interface circuit 7-2 to 7-1', so that line 4 only carries redundant data. Then, the maximum channel number recorded in configuration record 11 for the interface circuits 6-2 and 7-2 is increased, so that the control unit 10 again detects a discrepancy of records and actual channel numbers and blocks changes to connections of switching matrix 8' that go via line 4. Now the circuits 6-2, 7-2 shown in dashed lines in FIG. 5 may be exchanged as described above for circuits 6-1, 7-1.

It is understood that the input and output interfaces referred to above as separate units may be combined into pairs, so that they can only be exchanged by pairs.

The same steps are carried out at node 2, so that finally at both ends of lines 3, 4, there are more powerful interface circuits that allow an operation of the lines at a higher rate and/or with a higher multiplex.

Figure 6:
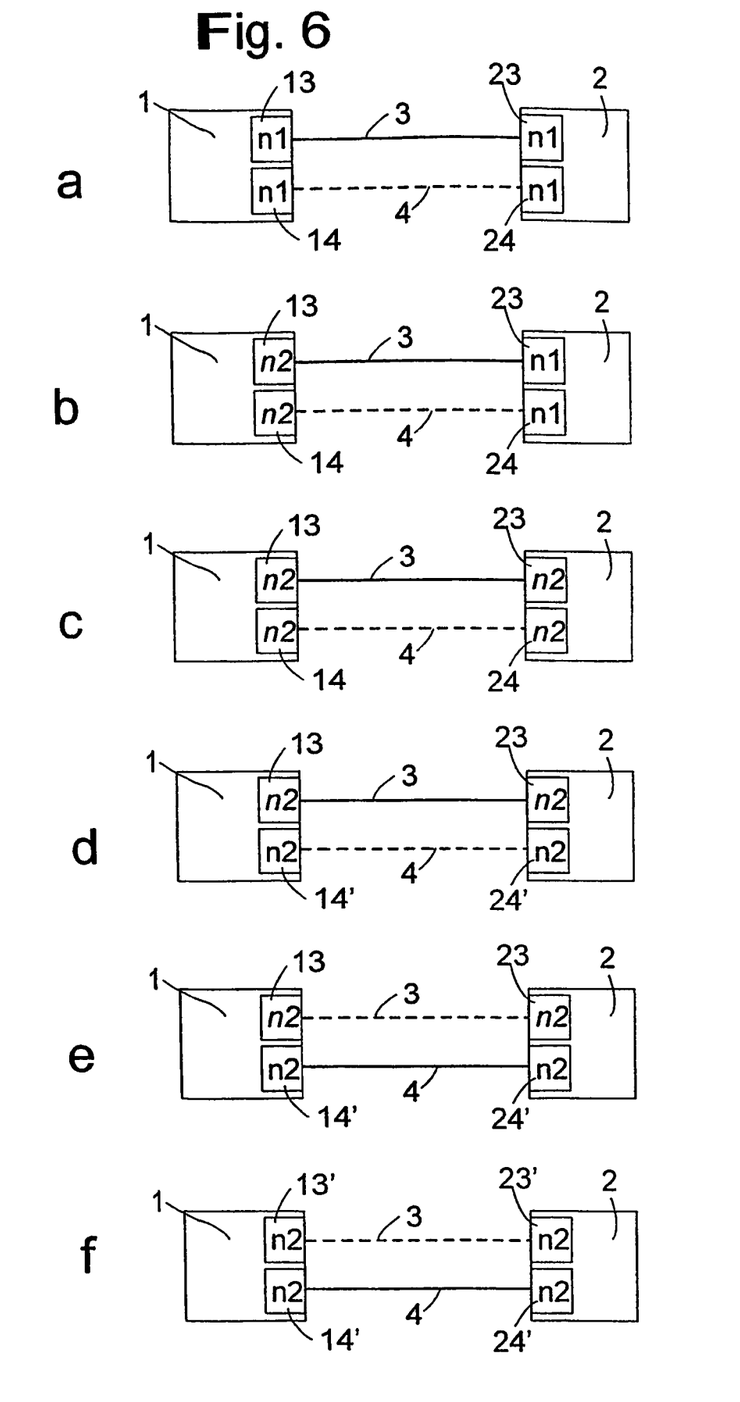
FIG. 6 schematically represents the course of the upgrade steps and the accompanying modifications carried out in the configuration record.

FIG. 6 shows in form of diagrams the individual steps that have to be carried out at nodes 1, 2 when exchanging the interface circuits connected to lines 3, 4. In FIG. 6, the nodes 1, 2 are shown as rectangles, each of the smaller rectangles 13, 14, 23, 24 shown within representing a bi-directional interface formed by the input and output interface circuits connected to line 3 or 4, respectively, in node 1 or 2, respectively. Inscriptions n1, n2 within the rectangles of circuits 13, 14, 23, 24 indicate the number of channels recorded in the configuration record 11 as the number of channels of the corresponding bi-directional interface. In FIG. 6a, this number is n1 for all interfaces. Upon an instruction from the user, the control units of 1, 2 have concentrated the working data traffic onto the interfaces 13, 23 and the data line 3 extending between them, whereas the redundant data traffic goes over interfaces 14, 24 and data line 4 connecting them. The representation of the data lines 3, 4 as solid or dashed lines indicates, in all parts of FIG. 6, the property of the data lines 3, 4 of being carrier of working or redundant data traffic.

FIG. 6b shows the configuration of the two nodes when node 1 has received and carried out an instruction to change the channel number recorded in configuration record 11 for the interfaces 13, 14 to a new value n2. The control circuit of node 1 recognizes an error, symbolized by the representation of the channel number n2 in italics, so that connections via node 1 and the lines 3, 4 may neither be established nor broken off.

A corresponding change is also effected in the configuration record of node 2, so that here, too, a configuration error is detected, represented by the inscription of interfaces 23, 24 in italics in FIG. 6c.

In the next step, the interfaces 14 of node 1 and 24 of node 2 that carry no working data traffic are replaced by a larger interface 14', 24' having the channel number n2. When the nodes 1, 2, of their own motion or because they have received a corresponding instruction, compare the processing capacity of the exchanged interfaces 14', 24' with the one recorded in configuration record 11, they find that there is no discrepancy any more, and they delete the error message, represented by the inscription in interfaces 14' and 24' appearing in normal type again in FIG. 6d. Thus, the interfaces at data line 4 are upgraded, and in the next step, the user data traffic is switched over to these, represented by a solid line 4 in FIG. 6d.

Since now the interfaces 13, 23 carry no more working data, they may also be replaced by interfaces 13', 23' having n2 channels, so that for these too, the maximum channel number recorded in the configuration record agrees again with reality (FIG. 6f). The restriction of the user data traffic to one of the two lines 3, 4 may now be removed again, whereby the process of exchanging the interface circuits is finished.

Since due to the freezing of connections in the switching matrices during the discrepancy between the actual channel number and the channel number recorded in configuration record 11, the existing connections remain switched in the switching matrix even if one of the interface circuits via which they normally go is removed, data traffic may be resumed via a new interface circuit as soon as it has been built in. The redundancy of the telecommunication network is thus only impaired during the short period in which an interface circuit is actually missing. As soon as a new interface circuit is built in, the redundancy is completely restored.

In the above description of the embodiments, 1+1 protection of the transmission on lines 3, 4 was assumed. In the 1:N protection mechanism one line out of N+1 lines is determined as a backup line on which, under normal operating conditions, void data or low priority data are transmitted, the transmission of which may be interrupted in case of need. When the node that receives data detects a failure of a line transmitting working data, it informs the sending node which then transfers transmission from the failed line to the backup line.

Figure 7:
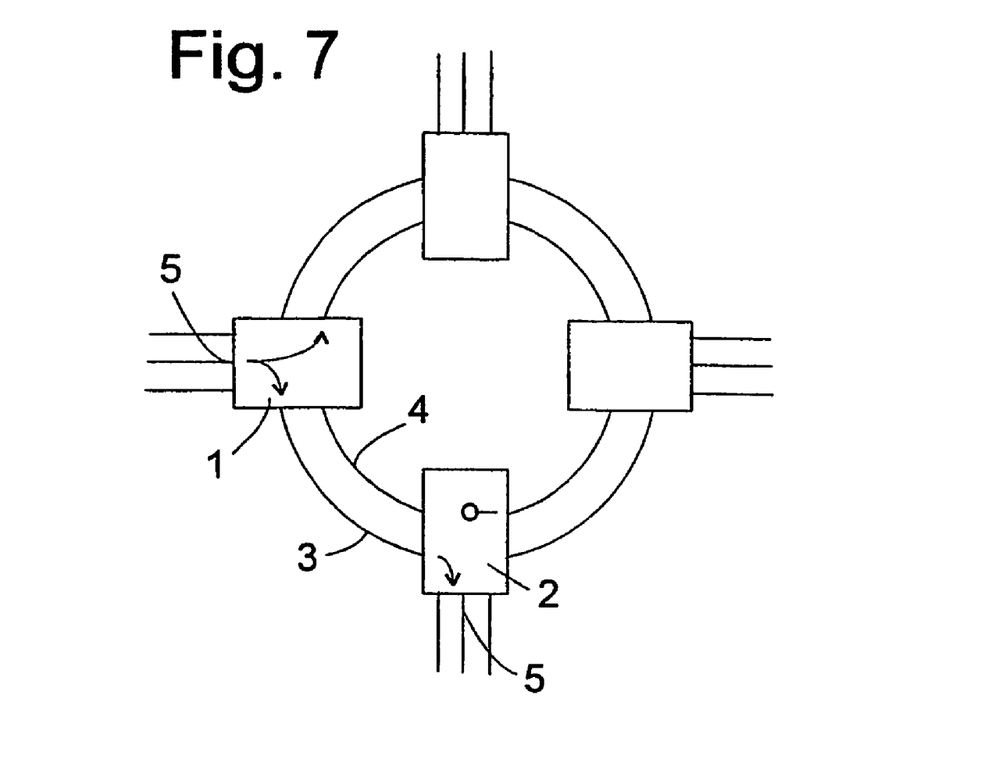
FIG. 7 represents a portion of a telecommunication network having nodes connected in a ring structure.

FIG. 7 shows a portion of a network with a plurality of nodes, four modes in the present case, which are connected to form a ring structure by data lines 3, 4 extending in pairs between them. In such a ring structure, it is advantageous to design a 1+1 protection mechanism so that working and redundant specimens of information units that are fed into the network by a terminal at a port 5 at node 1 and are intended for node 2 are transmitted there with different circulation directions (represented as arrows in node 1) on the lines 3 and 4 of the ring, respectively, so that e.g. the redundant specimen is transmitted on the inner ring 3 and is discarded in node 2, whereas the working specimen circulating on outer ring 4 is forwarded to a port 5 of node 2.

Analogously, 1:1 or 1:N protection between nodes 1, 2 may be implemented if in case of a failure of a section of ring line 3, 4 sections of the same or another line that are complementary to the failed sections are used as a backup line.

This creates an increased degree of failure safety of the network when compared to an operating mode in which working and redundant specimens of an information unit circulate in the same direction of the ring. As is easily recognized, in a co-circulating mode in case of an interruption of the lines 3, 4 directly connecting nodes 1, 2, no transmission between the nodes would be possible anymore, whereas in a countercirculating mode the redundant specimen reaches node 2 and may be forwarded to a receiver terminal at port 5. The upgrade of a ring network operated in this way is much more difficult than the case considered above referring to FIG. 1, since temporarily overlapping upgrades in a plurality of nodes of the ring become necessary. However, simultaneous interruptions at several places may lead to a complete interruption of transmission, which must be avoided under all circumstances.

Figure 8:
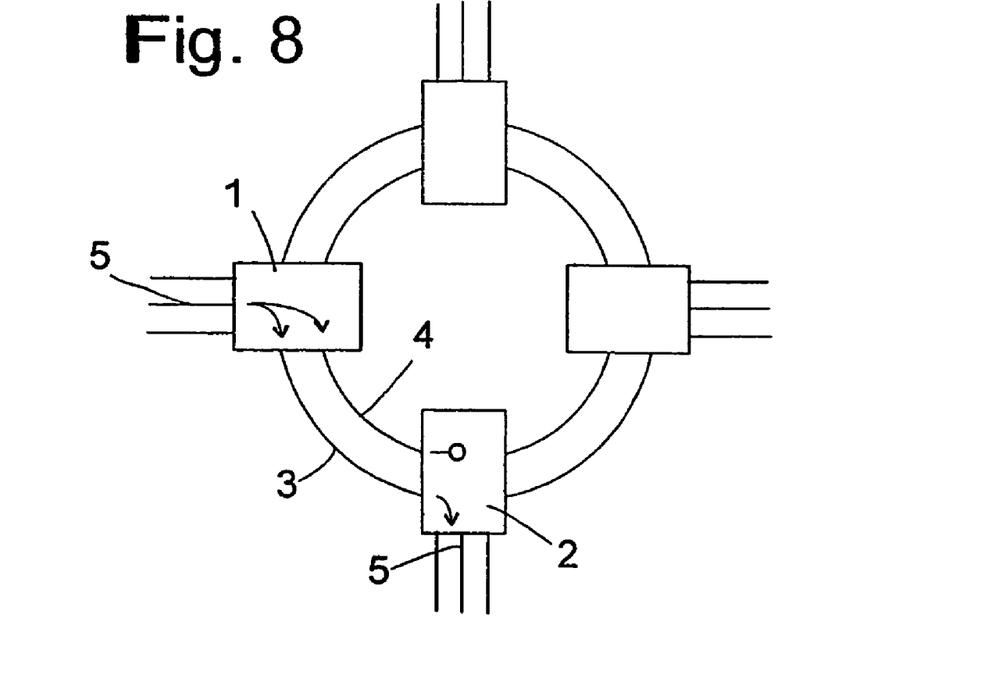
FIG. 8 is a configuration of the ring structure that allows for the upgrading method of the invention to be carried out.

However, this problem is solved by switching over the operating mode of the ring of FIG. 7 temporarily to a co-circulating propagation pattern for working and redundant specimens of the information units, as indicated in FIG. 8. In such an operating mode, the ring disintegrates into four regions of the type shown in FIG. 1, which may each be upgraded individually without having to take interactions with the other regions into account.

The invention claimed is:
1. A telecommunication network section, comprising:
 a) two nodes;
 b) a group of at least two bidirectional data lines extending between the two nodes;
 c) at least one of the data lines being redundant;
 d) each node including a control unit, at least one switching matrix, and a plurality of interface circuits;
 e) each data line being connected to an interface circuit of each of the two nodes;

f) each interface circuit being operative for transmitting a predetermined number of channels between a data line and the switching matrix;
g) the control unit of a node being operative for acceding to a configuration record which at any time specifies existing connections between channels of the interface circuits via the switching matrix; and
h) the control unit being operative for detecting whether an external condition is fulfilled or not, and, in case of non-fulfillment of the condition, for allowing changes to the connections recorded in the configuration record, and in case of fulfillment of the condition, for blocking changes to the connections recorded in the configuration record, while at the same time allowing transmission of information via the switching units of the node to continue.

2. The section of claim 1, in that each node is operative for transmitting a working specimen and at least one redundant specimen of each information unit to be transmitted to the second node via different data lines of the group and, among plural specimens of an information unit received from the second node via the data lines of the group to take account only of the working specimen.

3. The section of claim 2, in that the number of data lines in the group is two.

4. The section of claim 1, in that each node is operative, in case of a failure of the transmission of a working specimen to the second node by the predetermined data line, for determining another data line of a group.

5. The section of claim 1, in that the external condition is fulfilled or not individually for each interface circuit, and in that the control unit is operative for blocking changes, in case of the condition being fulfilled for one of the interface circuits, only for connections of the interface circuit for which the condition is fulfilled.

6. The section of claim 1, in that the control unit is operative for specifying a number of channels supported by each interface circuit of the node.

7. The section of claim 6, in that the external condition is a discrepancy between the number of channels of an interface circuit recorded in the configuration record and its actual number of channels.

8. The section of claim 7, in that the node is operative for modifying the recorded number of channels according to an external instruction.

9. The section of claim 8, in that the node is operative, after detection of fulfillment of the condition, for checking upon receipt of the external instruction whether the condition continues to be fulfilled, and, in case of non-fulfillment of the condition, to remove the blocking.

10. The section of claim 1, in that it is part of an SDH telecommunication network.

11. The section of claim 10, in that a number of channels of the interface circuit before upgrading is 16, and after upgrading is 64.

12. A method of upgrading a section of a telecommunication network, comprising the steps of:
a) removing working data traffic from a data line of a group of at least two bidirectional data lines extending between two nodes;
b) fulfilling an external condition;
c) replacing a pair of interface circuits of each node connected to the data line free from the working data traffic; and
d) repeating all the above steps until all pairs of interface circuits connected to the data lines of the group are exchanged, and the external condition is unfulfilled again.

13. The method of claim 12, wherein the external condition is a discrepancy between a number of channels of an interface circuit recorded in a configuration record and its actual number of channels.

14. The method of claim 13, in that the external condition is fulfilled by entering a number of channels that is different from the number of channels of an existing interface circuit into the configuration record and is unfulfilled by replacing the interface circuit by a new one and causing a control unit to compare the recorded number of channels with the number of channels of the new interface circuit.

15. The method of claim of 14, in that, before carrying out steps a) to c), upgrading at least one switching matrix of at least one of the nodes.

16. The method of claim 15, in that the node has at least two switching matrices and that, before exchanging one of these switching matrices, it is determined as the switching matrix for redundant specimens.

17. A method of upgrading a region of a telecommunication network, the region comprising a plurality of nodes interconnected to form a ring by groups of bidirectional data lines, the method comprising the step of: carrying out, for each section formed by two nodes of the ring and a group of data lines connecting the nodes, the steps of claim 12.

18. The method of claim 17, in that, before carrying out the steps of claim 17, a switchover is carried out from an operating mode in which working specimens and redundant specimens of the information units are transmitted in different directions on the ring into a mode in which the working and redundant specimens circulate in the same direction, and that, after these steps, it is switched back again to the mode in which the working and redundant specimens are transmitted in different directions.

* * * * *